United States Patent [19]
Hughes

[11] Patent Number: 5,844,036
[45] Date of Patent: Dec. 1, 1998

[54] HIGHLY FILLED INJECTION MOLDABLE POLYETHERKETONES

[75] Inventor: O. Richard Hughes, Chatham, N.J.

[73] Assignee: Hoechst Celanese Corp., Somerville, N.J.

[21] Appl. No.: 829,625

[22] Filed: Mar. 31, 1997

Related U.S. Application Data

[63] Continuation of Ser. No. 489,314, Jun. 9, 1995, abandoned.

[51] Int. Cl.[6] .............................. C08J 5/10; C08K 3/40; C08L 71/00
[52] U.S. Cl. ...................... 524/494; 524/495; 524/449; 524/404; 524/420; 524/436
[58] Field of Search ................................... 524/493, 494, 524/495, 496, 449, 396, 406, 404, 420, 436

[56] References Cited

U.S. PATENT DOCUMENTS

| | | | |
|---|---|---|---|
| 5,106,680 | 4/1992 | King et al. | 428/288 |
| 5,131,827 | 7/1992 | Tasaka | 418/55.2 |

FOREIGN PATENT DOCUMENTS

| | | |
|---|---|---|
| 0031198 | 7/1981 | European Pat. Off. . |
| 0182580 | 5/1986 | European Pat. Off. . |
| 91241132 | of 1989 | Japan . |

*Primary Examiner*—James J. Seidleck
*Assistant Examiner*—U. K. Rajguru
*Attorney, Agent, or Firm*—William J. Botjer

[57] ABSTRACT

Injection moldable, highly filled polymer composites are provided which exhibit high dimensional stability at temperatures above the glass transition temperature of the matrix polymer. The heat distortion temperature of the composites approaches that of the crystal melting temperature of the matrix polymer. The composite includes a polyaryletherketone matrix and at least two types of fillers each providing unique properties. The first filler is a reinforcing fiber filler which provides high strength and stiffness. The second filler is an non-thermoplastic immobilizing filler to immobilize the amorphous portion of the partially crystalline polyaryletherketone polymer and provide resistance to high temperature distortion. Notwithstanding its improved mechanical and heat resistant properties, the composite remains injection moldable and thus capable of low cost manufacturing.

20 Claims, 1 Drawing Sheet

HIGHLY FILLED INJECTION MOLDABLE POLYETHERKETONES

This application is a continuation, of application Ser. No. 08/489,314 filed Jun. 9, 1995, now abandoned.

BACKGROUND AND SUMMARY OF THE INVENTION

This invention relates to moldable thermoplastics and particularly to highly filled injection moldable polyaryletherketones suitable for use as engineering plastics.

Polyaryletherketone polymers comprise a number of closely related polymers including polyetherketone (PEK), polyetheretherketone (PEEK), polyetheretherketoneketone (PEEKK), polyetherketonetherketoneketone (PEKEKK) and polyetherketoneketone (PEKK). These polymers are moldable, and thus easily formed into usable parts. They exhibit excellent long term oxidative stabilities at elevated temperatures (see U.S. Pat. No. 4,320,224 issued Mar. 16, 1982 for "Thermoplastic Aromatic Polyetherketones"). Of the polyaryletherketones, polyetheretherketone (PEEK) is widely commercially available and has been found to be an excellent thermoplastic molding resin. At ambient temperatures PEEK exists as a solid with crystalline and amorphous phases. The amorphous phase, which comprises 52 to 70% of the polymer softens at of temperatures about 143° C.–155° C., corresponding to the glass transition temperature, Tg, of the amorphous phase.

The remaining 48–30% of the polymer exists as a crystalline phase with a melting temperature, Tm, of ~335° C. which is dispersed in the amorphous phase. The polymer softens when heated above Tg and melts at temperatures above Tm. Unfilled grades of partially crystalline polymers like PEEK are not useful in molded part forms at temperatures much above their Tg since the softening that occurs leads to a sharp loss in polymer mechanical properties, especially stiffness (i.e., modulus). This lowered stiffness is reflected in reduced dimensional stability under stress at temperatures above Tg.

Molded objects will undergo a creep process and become temporarily or permanently deformed. The heat capacity of the completely amorphous PEEK phase increases by maximum amount [78 J / (K*mol)] at the PEEK glass transition temperature, Tg, as motions in the amorphous phase are thermally activated. That portion of the amorphous phase that is mobilized at the glass transition temperature is referred to as the mobile amorphous phase. It has been noted however (B. Wunderlich, et.al., Macromolecules (1986), 19 1868–1876) that the actual heat capacity increase that is observed may be less than the maximum. The actual increase is dependant on processing history and the amount and morphology of the crystalline phase that is also present. Increases of less than the maximum amount at Tg indicate that fewer polymer motions are thermally activated as the Tg is exceeded. The magnitude of the difference between the actual heat capacity increase and the maximum increase is an indication of the presence and amount of a phase referred to as a rigid amorphous phase. This phase remains rigid to temperatures well above Tg and eventually melts as the temperature rises to near the crystalline melting temeprature. Similarly, in the invention described below, a rigid amorphous phase is believed to be formed from amorphous phase polymer that has been immobilizeed at the interface of the amorphous and crystalline phases in the partially crystalline PEEK materials.

Practical measures have been developed to characterize the maximum temperature to which a polymer retains useful mechanical properties. Widely used examples are the "Heat Distortion Temperature" (HDT) or "Deflection Under Load Temperature" (DTUL) tests. The HDT of a polymer or polymer composite is the temperature at which a test specimen begins to bend by a defined amount under a defined load (264 psi). The HDT of unfilled PEEK is relatively low (160° C.) due to the softening that occurs above its Tg. Thus unfilled PEEK cannot be considered for molded part applications that require use temperatures above about 160° C. even though it exhibits long term oxidative stability at higher temperatures and a much higher crystalline melting temperature. Thus PEEK would be useful at higher temperatures if its low thermal-mechanical stability could be enhanced.

It is well known that the HDT of partially crystalline polymers, such as PEEK, can be raised by incorporating filler materials, especially reinforcing fiber fillers. For example, PEEK grades containing 10–30 wt. % (corresponding to 5–17% on a volume basis) short glass fibers exhibit increased HDT's, as follows:

| gf (wt.) | gf (vol. %) | HDT °C. |
| --- | --- | --- |
| 0 | 0 | 160 |
| 10 | 5 | 200 |
| 20 | 10 | 285 |
| 30 | 17 | 315 |

PEEK grades with glass or carbon fiber fillers are commercially available (for example: Victrex PEEK, grade 150GL30, is a PEEK composite filled with 30 wt. % chopped glass fiber.

HDT is a relatively crude measure of polymer rigidity. More rigorous tests reveal that simple glass or carbon fiber-filled PEEK composites still suffer varying degrees of stiffness loss at temperatures above Tg. For certain critical applications it is desired that molded parts exhibit highest dimensional stabilities under stress at elevated temperatures. For these applications the greater rigidity, in terms of the stiffness or modulus of a composition that more sensitive tests reveal, is a useful property.

Rigidity or dimensional stability in a polymer and its composites is a function of the moduli, E, of the polymer and fillers it contains. Rigid materials, materials with high moduli, exhibit small changes in dimension (strain) when stresses are applied. This is defined by the relationship in equation 1:

$$\text{instantaneous modulus (E)} = \text{stress}(\sigma)/\text{strain}(\epsilon) \qquad \text{eq. 1}$$

The strain produced by short duration (instantaneous), small amplitude stresses is said to be elastic (elastic strain denoted as $\epsilon_o$) since the original part dimension is regained when the stress is removed.

In polymers and polymer composites, the strain produced when the stress is applied for a longer duration can have another component, a permanent deformation or creep component, $\epsilon_t$, which is not recovered when the applied stress is removed. Equation 1 can be modified to include the plastic flow component of strain:

$$E_a = \sigma_t / (\epsilon_o + \epsilon_t) \qquad \text{eq.2}$$

where $\epsilon_t$ is the apparent modulus of the polymer or composite, $\sigma_t$ is the stress applied over time. The apparent modulus of a material, $E_a$, decreases with time as the continually applied stress induces greater and greater strains primarily due to plastic flow in the polymer.

The creep component, $\epsilon_t$, and its change with time that will be induced by applied stress can be estimated from $E_a$, and $\sigma_t$ via a rearrangement of equation 2:

$$(\epsilon_o + \epsilon_t) = \sigma_t / E_a \qquad \text{eq.3}$$

For example, a material exhibiting a modulus, $E_a$, 1 GPa at time, t, exhibits a strain ($\epsilon_o + \epsilon_t$) of 0.7% under an applied stress of 1000 psi, since:

$$(\epsilon_o + \epsilon_t) = 1000 \; psi \; (6895 \; Pa/psi) * 100 / 1 * 10^9 \; Pa = 0.7\%$$

The elastic strain and creep induced by an applied stress is minimized in materials with high moduli. It is an object of this invention to provide polymer composites with enhanced moduli that exhibit greater dimensional stabilities under applied stresses.

The dimensional stability of polymer and polymer composites is lower (creep is higher) at elevated temperatures because the stiffness of the polymer matrix in these composites is lower at elevated temperatures. However, it is possible to formulate polymer composites with greater dimensional stabilities at elevated temperatures because of the greater high temperature moduli that can be designed into composites using the techniques of this invention.

The moduli of polymer composites at elevated temperatures can be characterized by one or more methods; for example:

Dynamic Mechanical Analysis (DMA) scans of the storage modulus, E', over a temperature range up to ~350° C., Short term DMA measurements of the apparent flexural modulus, $E_a$, over a sequence of temperatures, coupled with a time/temperature superposition analysis to estimate the apparent flexural moduli, $E_a$, and creep ($\epsilon_o + \epsilon_t$) at a reference temperature (300° C. in the case of PEEK composites).

Long term direct measurement of the flexural moduli, $E_a$, and creep ($\epsilon_o + \epsilon_t$) in tests in ovens at elevated temperatures (500°, 600°, and 650° C. for PEEK composites).

Filled polymer parts can be economically fabricated in a simple three step process that comprises: compounding, melt extrusion, and molding. In compounding, dry filler and polymer powders are intimately mixed. In melt extrusion, the powder blend is melted and further mixed and kneaded by the action of an extruder screw and formed into a strand on exiting the extruder through a orifice. The extruded strand can be cooled by a variety of means and cut into convenient sizes for use as fed to a molding machine. A variety of molding methods are practiced but injection molding is the most important of these, commercially, because of the high productivity of this approach. In injection molding, the extruded pellets from the extruder are remelted in an extruder section of an injection molder and forced into a mold where the melt is cooled and solidified.

The melt viscosity of a polymer composite is an important determinant of success in extrusion and molding. The melt viscosity of polymers and polymer composites can be measured with a capillary melt viscometer. For melt processing by standard widely available extruder and injection molding equipment, filled polymer compositions should have a melt viscosities between about 2000 and 15,000 poise at attainable melt temperatures. Lower viscosities lead to drooling and flashing problems. Higher viscosities cannot be handled with the power, pressures, and metallurgy available in most commercial equipment.

Simple filled polymer composites have melt viscosities that approach the limit of melt processability at about 30 wt. % loading levels. This is the limit of filling in most commercially available filled resins. The addition of greater amounts of filler makes the composites so stiff as to be unworkable by conventional high volume molding techniques, such as injection molding. When the composite can be handled only by special molding techniques, the cost becomes impractical.

The present invention is directed to producing PEEK composites that exhibit highest possible dimensional stabilities at elevated temperatures while also possessing melt viscosities in a range that is processable on extrusion and injection molding machines. The enhanced dimensional stability is observed in the high HDT's, the high flexural moduli at elevated temperatures, the high storage moduli at elevated temperatures, and the low creep of these composites of this invention.

As noted above, unfilled PEEK is a polymer with crystalline and amorphous phase components. Upon cooling unfilled PEEK, PEEK crystallites form in a matrix of amorphous PEEK. When filler particles are present they are found in the amorphous phase of the polymer and rarely, if ever, found within the crystalline phase. This occurs since PEEK crystallites form from molten polymer residing between filler particles when a filled PEEK composite is cooled to freezing. The crystallites do not grow and engulf the filler particles. (Some filler particles can nucleate the formation of crystallites which then appear to grow from the filler particle surface.)

It is believed that the composites of this invention exhibit their enhanced dimensional/thermal stability because a larger fraction of the PEEK amorphous phase is immobilized; by association with the crystalline phase but also by adsorpton on the filler partciles. Filler particles provide an additional immobilizing surface for the formation of a rigid amorphous phase.

In unfilled PEEK, the amount of rigid amorphous phase that can form is limited by the crystallinity that is present.

In the filled PEEK specimens the amount of rigid amorphous phase that can form is determined by the amount and morphology of the filler particles that are present as well as by the PEEK crystallites. Shapes formed from these filled PEEK composites exhibit greater dimensional stabilities at temperatures above the Tg of PEEK because more of the amorphous phase exists as a rigid amorphous material that does not soften at the Tg of the amorphous phase.

Both the filler particles and the PEEK crystallites are surrounded by amorphous phase PEEK. The thermomechanical properties of the filled composite are limited by the Tg of this amorphous phase. However, in contrast to unfilled PEEK, the amorphous phase in filled PEEK composites is in close proximity to filler particles and can adsorb on the surface via non-specific, physical (Van der Waals) interactions. This adsorption reduces the mobility of the polymer. Hence, the adsorption of polymer on filler (and on PEEK crystallites) stiffens the polymer and increases its dimensional stability. As a result, filled PEEK composites soften at higher temperatures than un-filled PEEK. The highly filled PEEK composites of this invention exhibit very high HDT's, approaching 335° C., the melting temperature of the crystalline phase. The amount of surface area provided by the filler content in commonly available filled PEEK's, even at 30% (wt.) filled levels, is not sufficient to completely immobilize the amorphous PEEK and hence do not provide all the benefits of the high filler contents in the PEEK composites of this invention. Simply increasing the content of an equiaxed or fibrous filler will not be effective since this will lead to brittle or unprocessable compositions.

More recently composites of polybenzimidazole (PBI) in polyaryletherketones and other polymers have been described (see U.S. Pat. Nos. 5,070,153; and 5,139,862). Highly-filled PEEK composites with PBI and solid lubricant fillers, have been described (U.S. Pat. No. 5,391,605). Finally, highly-filled, processable, PEEK composites with PBI and glass or carbon fiber fillers were described (U.S. Pat. No. 4,912,176 and U.S. patent application Ser. No. 07/883,838, filed May 15, 1992, titled "Reinforced Injection Moldable Blends"). However, PBI is an expensive polymer ($50.00 to $75 per pound (1994–5)). PBI is a thermoplastic polymer in the sense that it can be compression molded at elevated temperatures. It can not be generally considered for applications as filler, unless it provides a specific benefit that common fillers do not provide. It is an object of the present invention to show that common, inexpensive fillers can be used in lieu of PBI. Rather the present invention uses inexpensive, non-thermoplastic fillers as a described in detail below.

The present invention overcomes the limitations of commonly available filled PEEK's and the high cost of highly-filled, PBI-containing PEEK composites while providing composites that are processable with standard extrusion and injection molding equipment. The highly filled polymer composites of the present invention exhibit high dimensional stability at temperatures above the glass transition temperature of the matrix polymer. The heat distortion temperature of the composites approaches that of the crystal melting temperature of the matrix polymer, beyond which no further increase is possible. The composite includes a polyaryletherketone matrix and two types of fillers each providing unique properties. The first filler is a reinforcing fiber filler which provides high strength and stiffness. The second filler is a non-thermoplastic immobilizing filler to immobilize the amorphous portion of the partially crystalline polyaryletherketone polymer and provide resistance to high temperature distortion. Notwithstanding its improved mechanical and heat resistant properties, the composite remains injection moldable and thus capable of low cost manufacturing. The improved composites also raise the stiffness and strength of the PEEK and reduce creep.

BRIEF DESCRIPTION OF THE DRAWINGS

For a better understanding of the invention, reference is made to the following drawings which are to be taken in conjunction with the detailed description to follow.

DESCRIPTION OF THE PREFERRED EMBODIMENTS

Figure 1:
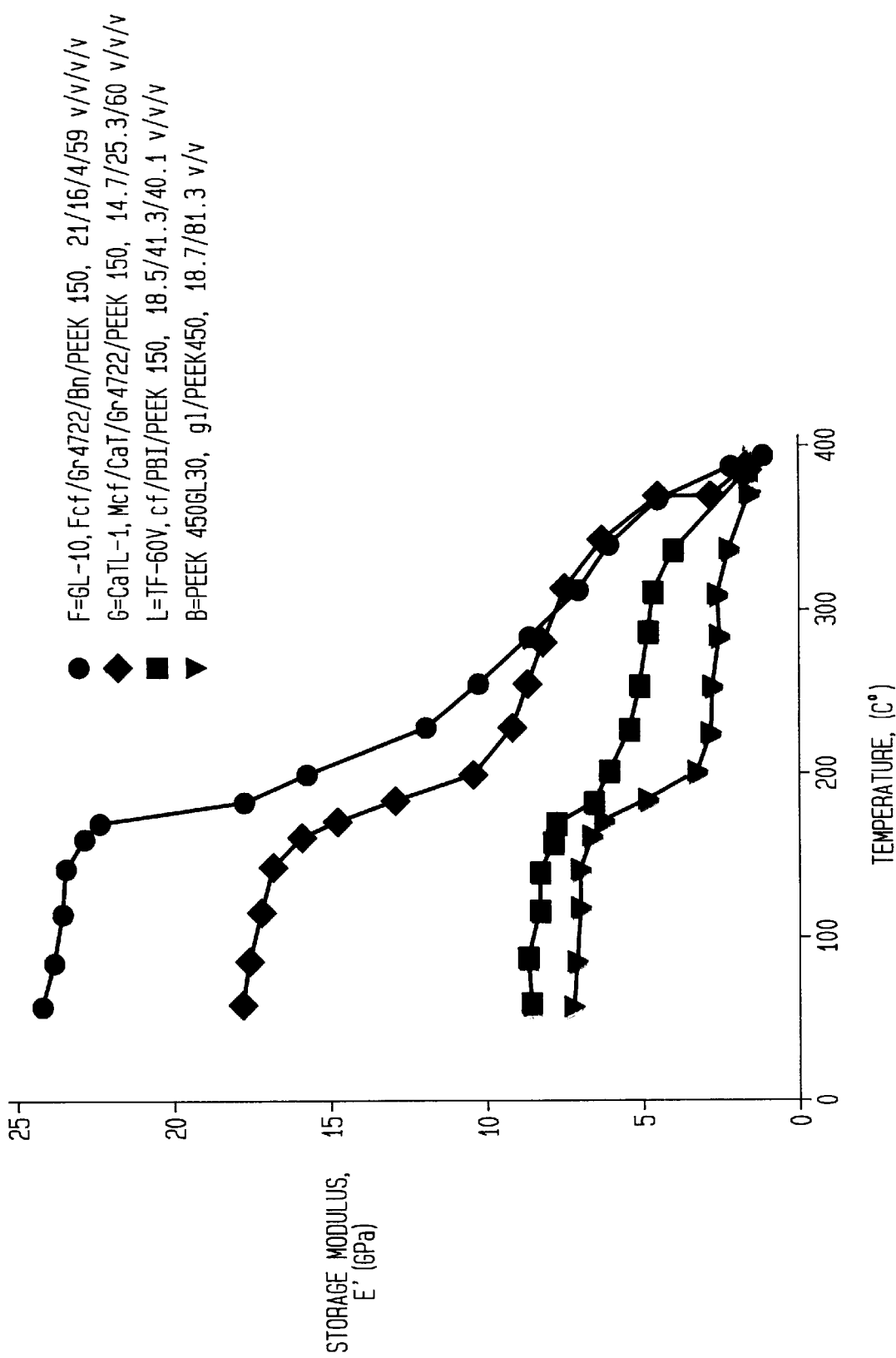
FIG. 1 is a composite of DMA scans of Storage modulus vs temperature.

The polymers used as the matrix for the filled composites of the present invention are the polyaryletherketones, which have the general formula:

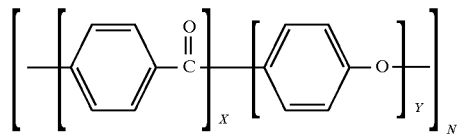

where X, Y and N are integers. An exemplary polyaryleneketone is polyetherketone having the repeating unit:

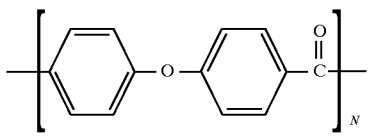

Polyetheretherketone, having the repeating unit:

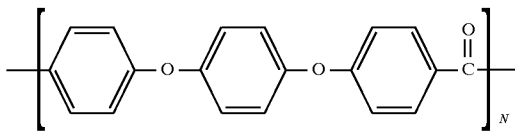

is also a crystalline thermoplastic having properties similar to those of polyetherketones.

A third exemplary polyaryleneketone is polyetheretherketoneketone having the repeating unit:

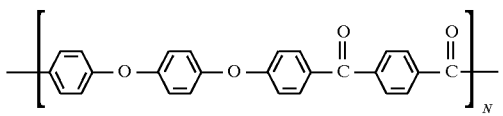

A fourth exemplary polyaryleneketone is polyetherketoneketone having the repeating unit:

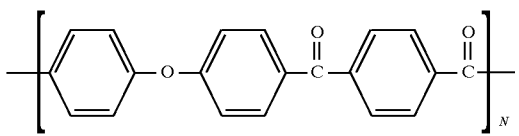

The present invention replaces the single filler (e.g., glass fibers) of prior art polyaryletherketone composites with a reinforcing fiber and a non thermoplastic immobilizing filler to provide maximum performance at elevated temperatures. Indeed, the Heat Distortion Temperatures can be raised to within a few degrees of the crystalline melting temperature which is the absolute limit. This is accomplished while retaining the ability to form the material by inexpensive molding processes such as injection molding. If necessary for the application to which the material is to be put, lubricants can be added to the composite.

The present invention provides highly-filled polyaryletherketone composites that are formed with at least two types of fillers. The types are defined as:

Type (a): a reinforcing fiber filler. The primary function of the reinforcing filler is to strengthen the composite. Reinforcing fiber fillers can be selected from a variety of widely-available fibrous filler materials which includes most predominantly: chopped glass and chopped carbon fiber fillers. These fillers typically have fiber diameters in the range 5 to 15 micrometers and initial lengths of 1/16, 1/8, 1/4 inch. (The reinforcing fiber length is often reduced by the shear of compounding and molding to lengths in the 200–500 micrometer range.) Because of their length these fiber fillers can not be easily incorporated at levels above about 30 wt. % (17 vol %) because the molten composite is then too viscous for standard melt processing equipment.

Type (b): a non-thermoplastic immobilizing filler: The function of the immobilizing filler is to provide additional surface area or volume in the composite without a proportionately increasing the melt viscosity of the composite. Immobilizing fillers can have a variety of morphologies, including equiaxed, platelet or fibrous (whisker) shapes. Immobilizing fillers are chosen to pack well with the reinforcing filler particle. Combinations that pack well exhibit lowest melt viscosities hence retain good melt processability.

Through combinations of reinforcing and immobilizing fillers the fraction of the volume of a composite occupied by filler particles can be substantially increased. The reinforcing filler can be used up to the levels normally used (typically 15–20 vol %). In addition the immobilizing filler can be added in amounts of 30 to 45 vol %. Total filler contents ranging from 45 to 65 vol % are possible without exceeding processable melt viscosities.

Fillers with exceptionally small particles (i.e., sub micrometer average particle dimension) have large surface areas (typically >20 m$^2$/g) which stiffen the composite by the high PEEK-immobilizing surface they provide. This additional PEEK-immobilizing surface assures that the amorphous PEEK component will be more completely adsorbed and stiffened.

Fillers based on relatively large, high modulus particles (i.e., 50–200 micrometer particle dimension) have modest particle surface areas (typically 1–20 m$^2$/g). These stiffen a composite by two mechanisms: 1) the modest additional surface they provide leads to a modest stiffening via the PEEK-immobilizing mechanism, and 2) the higher stiffness that most high modulus, inorganic filler materials exhibit compared to PEEK and other polymers contributes composite stiffness in proportion to their content on a volume fraction basis. The non thermoplastic immobilizing filler can be selected from the broad range of materials with equiaxed, platelet, or whisker morphologies. Examples include:

equiaxed particles: calcium carbonate, magnesium carbonate, silica, alumina, aluminum nitride, borax, activated carbon, pearlite, zinc terephthalate, Bucky balls, etc.

platelet particles: graphite, talc, mica, synthetic Hectorite, silicon carbide platlets, (Note: melt-derived PBI thermoplastic particles are roughly platelet shaped).

whisker shaped particles: Wollastonite, calcium terephthalate [Ca (H$_4$C$_8$O$_4$)], silicon carbide whiskers, Aluminum borate whiskers, fullerene tubes. (Various asbestos fibers could be used but pose an inhalation hazard).

The composite can also contain a third filler type, one provided to confer an additional property. Properties that can be enhanced by addition of minor amounts of fillers include: lubrication, wear resistance, electrical conductivity, thermal conductivity, enhanced abrasion. Suitable lubricant fillers are crystalline graphite, boron nitride and molybdenum disulfide.

The following Tables 1 and 2 present a number of exemplery compositions (Codes C–K) formulated in accordance with the present invention in comparison to commercially available unfilled PEEK (Code A) and filled PEEK (Code B). Also included, for comparison, is a composition (Code L) which utilizes the thermoplastic PBI as an immobilizing filler. As can be seen from the table, a number of the compositions have a HDT of 10°–20° C. greater than that of the filled PEEK, have higher strength at cheaper cost yet retain a melt viscosity of less than 8500 poise which permits articles to be injection molded from the compositions which significantly reduces manufacturing costs. In comparison, the PBI filled PEEK composite, while having an elevated HDT, has a relatively high melt viscosity and a high cost. It is seen that the composition may be varied to provide the physical properties needed by the article to be manufactured.

The following non-limiting Examples illustrate several embodiments of the present invention. However, these Examples are only intended as illustrative, and the scope of the present invention is not limited to the embodiments illustrated herein; the scope of the present invention encompasses the entire subject matter covered by the appended claims.

TABLE 1

| Code | Composition V % | HDT at 264 psi °C. | Melt Viscosity at 430° C. | Tensile Strength (KSI) | $/lb. |
|---|---|---|---|---|---|
| A | PEEK 150 100 | 169 | | 15 | 35.00 |
| B | GF/PEEK (450 GL-30) 18.7/81.3 | 313 | | 22.9 | 24.82 |
| C | GF/MICA/PEEK 16/30/54 | 307 | | 17 | 16.50 |
| D | GF/MICA/PEEK 21/26/53 | 323 | | 17 | 17.77 |
| E | MCF/GR-A/BN/PEEK 21/26/4/53 | 320 | 8114 | 16.7 | |
| F | FCF/GR-B/BN/PEEK 21/16/4/59 | 331 | 6129 | 20 | 25.33 |
| G | CF/CAT/GR-B/BN/PEEK 14.7/11.2/11.2/2.8/60 | 333 | 4136 | 21 | 22.50 |
| H | CF/CAT/GR-B/BN/PEEK 14.7/20.2/2.3/2.8/60 | 330 | 4088 | 25.8 | 25.50 |
| I | CF/CAT/PEEK 14.7/25.3/60 | 329 | 3666 | 25.9 | 24.00 |
| J | CF/CAT/PEEK 15/35/50 | 329 | 4572 | 25.1 | 20.75 |
| K | CF/CAT/PEEK 15/45/40 | 323 | 6184 | 21.7 | 17.62 |
| L | GF/PBI/PEEK 18.5/41.3/40.1 | 324 | 12920 | 19.7 | 33.48 |

PEEK = ICI Victrex Peek Resin 150 fp, fine powder
PEEK(450 GL-30) = ICI Victrex Peek 450 GL-30, 30 wt % chopped glass fiber in PEEK 450 resin
GF = Glass Fiber, Corning 731 ED
CF = Carbon Fiber
MCF = Milled Carbon Fiber, Hercules Magnemite, 1/8" chopped, with an Ultem ™ surface coating
MICA = Suzorite Mica, grade 200 HK powder, 150 µm max.particle dimension
CAT = Calcium Terephthalate powder
GR-A = Superior Graphite, Crystalline Graphite Flake, 5 µm max. particle dimension
GR-B = Superior Graphite, Crystalline Graphite Flake, 150 µm max. particle dimension
FCF = Akzo Fortafil, 1/8" chopped, carbon fiber with an epoxy surface coating
BN = Boron Nitride powder

TABLE 2

| Composition Code | Storage Modulus @ 25° C. (M psi) | Storage Modulus @ 300° C. (M psi) | Flex Modulus @ 500° F. (M psi) |
|---|---|---|---|
| A | | | — |
| B | | | — |
| C | | | 0.57 |
| D | | — | — |
| E | 3.2 | .52 | — |
| F | 3.60 | .76 | — |
| G | 2.66 | .88 | .98 |
| H | 1.05 | .53 | .95 |
| I | 1.70 | .55 | .80 |
| J | 2.30 | .80 | .95 |
| K | 2.30 | .85 | 1.19 |
| L | 1.41 | .49 | 0.56 |

The improved physical properties of the inventive composites are further illustrated in FIG. 1 which is based on dynamic mechanical analysis (DMA). Several DMA scans (storage modulus, E', vs temperature) of composition codes F,G,L and B are superimposed in the FIG. 1 plot to illustrate the information that can be extracted. Codes F and G are composites formulated in accordance with the present invention, code B is commercially filled PEEK and code L is PBI filled PEEK. Each curve is a plot of the storage modulus, E', of a PEEK composite in molded bar form versus temperature. The composites differ in stiffness both at low and high temperatures.

At temperatures below 150° C. each composite exhibits a relatively high E', typically 5 GPa or more. At temperatures above 150° C. the composites exhibit lower moduli, typically less than 5 GPa. The decline in E' occurs at temperatures around the Tg of PEEK and reflect the increased mobility that the PEEK amorphous component acquires at temperatures above the glass transition temperature. For dimension stability and creep resistance it is necessary that a material retain a significant fraction of its low temperature modulus at temperatures above the Tg of the matrix polymer. FIG. 1 indicates that the amount and type of fillers in a partially crystalline polymer, like PEEK, can have a significant impact on the modulus of the polymer composite, above as well as below, the Tg of the polymer.

In PEEK composites of this invention (Codes F and G) the decline in modulus at temperatures above 150° C. is minimized through use of high concentrations of combinations of fillers. DMA scans of the storage modulii as function of temperature of these composites can be used to predict the dimensional stability that these composites will exhibit. This information can be summarized by reporting the storage modulus at a single temperature. For PEEK composites, 300° C. was chosen since the composites of this invention exhibit useful dimensional stabilities to temperatures in this range.

The compositions in accordance with the present invention may be made by any suitable means, typically by melt blending in an extruder. Generally the inventions compositions exhibit HDT's (264 psi) within 20° C. of the $T_m$ of the matrix polymer, while within 15° C. preferred and within 10° C. of the melting point of the crystalline is even more preferred. In general at least 40 volume per cent fiber and filler are used, but the high temperature dimensional stability may be achieved with as low as 15 vol % in very crystalline polyarylether ketones. 50 volume per cent or more filler may be used so long as the melt viscosity of the composition does not become too high, that is below about 10,000 poise at at a shear rate of 1000 sec$^{-1}$ at 430° C. and below 7500 poise at these conditions being preferred. Typically, the inventive composition include less than 25 vol % of the fiber filler with less than 21 volume per cent or so being preferred.

While the present invention has been herein described in what is presently conceived to be the most preferred and exemplary embodiments thereof, those in this art may recognize that many modifications may be made thereof, which modification shall be accorded the broadest scope of the appended claims so as to encompass all equivalent methods and products.

What is claimed is:

1. A polymer composite for molding articles having improved strength and resistance to heat distortion comprising:
   a) a partially crystalline and partially amorphous polyaryletherketone polymer,
   b) a reinforcing fiber for providing strength and stiffness to the molded article,
   c) an immobilizing filler for immobilizing the amorphous portion of the polyaryletherketone polymer to provide additional stiffness and dimensional stability at elevated temperatures, and
   d) said reinforcing fiber and said immobilizing filler forming at least 40% of the volume of the composite and raising the heat distortion temperature at 264 psi of the composite to above 300° C. and having a melt viscosity of less than 10,000 poise at 1000 sec$^{-1}$ at 430° C.

2. The composite as claimed in claim 1 wherein the polyaryletherketone polymer is selected from the group consisting of polyetherketone, polyetheretherketone, polyetherketoneetherketoneketone, polyetheretherketoneketone and polyetherketoneketone polymers.

3. The composite as claimed in claim 1 wherein the reinforcing fiber is selected from the group consisting of glass fibers and carbon fibers.

4. The composite as claimed in claim 1 wherein the immobilizing filler is selected from the group consisting of equiaxed and platelet shaped particles.

5. The composite as claimed in claim 1 wherein the immobilizing filler has no dimension larger than 200 μm.

6. The composite as claimed in claim 1 wherein the volume percentage of reinforcing fiber does not exceed 25%.

7. The composite as claimed in claim 1 further including a solid lubricant filler.

8. The composite as claimed in claim 7 wherein the solid lubricant is selected from the group consisting of graphite, molybdenum disulfide, and boron nitride in powder form.

9. The composite as claimed in claim 1 wherein the total volume content contributed by the reinforcing fiber and the immobilizing filler is between 40 and 60%.

10. A composite as claimed in claim 1 wherein the composite has a melt viscosity of less than 7500 poise at 1000 sec$^{-1}$ at 430° C.

11. A polymer composite for molding articles having improved strength and resistance to heat distortion, formed from a homogenous mixture comprising:
   a) a partially crystalline and partially amorphous polyaryletherketone polymer,
   b) a reinforcing fiber for providing strength and stiffness, said reinforcing fiber comprising less than 25% by volume of the article.
   c) a non-thermoplastic immobilizing filler for immobilizing the amorphous portion of the polyaryletherketone polymer, said immobilizing filler being selected from the group consisting of equi-axed and platelet shaped materials; and
   d) said reinforcing fiber and said immobilizing filler forming at least 40% by volume of the composite and raising the heat distortion temperature of the composite at 264 psi to above 300° C. and within 20° C. of the crystalline melting point of the polyaryletherketone polymer and having a melt viscosity of less than 10,000 poise at 1000 sec$^{-1}$ at 430° C.

12. The composite as claimed in claim 11 wherein the polyaryletherketone polymer is selected from the group consisting of polyetherketone, polyetheretherketone, polyetherketoneetherketoneketone, polyetheretherketoneketone and polyetherketoneketone polymers.

13. The composite as claimed in claim 11 wherein the reinforcing fiber is selected from the group consisting of glass fibers and carbon fibers.

14. The composite as claimed in claim 11 wherein the immobilizing filler is selected from the group consisting of mica, graphite flakes and calcium terephthalate.

15. The composite as claimed in claim 11 wherein the immobilizing filler has no dimension larger than 200 μm.

16. The composite as claimed in claim 11 further including a solid lubricant.

17. The composite as claimed in claim 16 wherein the solid lubricant is selected from the group consisting of graphite powder, molybdenum disulfide and boron nitride.

18. The composite as claimed in claim 11 wherein the volume percentage of the reinforcing fiber and the immobilizing filler is between 40 and 60%.

19. A polymer composite for producing melt processable articles having improved strength and resistance to heat distortion formed from a homogenous mixture comprising:

a) a partially crystalline and partially amorphous polyaryletherketone polymer, b) a reinforcing fiber filler for providing strength and stiffness, said filler comprising less than 25% by volume of the article.

c) a platelet shaped immobilizing filler for immobilizing the amorphous portion of the polyaryletherketone polymer, and d) said reinforcing fiber and said immobilizing filler forming at least 40% by volume of the composite and raising the heat distortion temperature of the composite at 264 psi to above 300° C. and having a melt viscosity of less than 10,000 poise at 1000 sec$^{-1}$ at 430° C.

20. The composite as claimed in claim 19 wherein the platelet shaped immobilizing filler is selected from the group consisting of graphite, talc, mica, synthetic hectorite, silicon carbide and melt derived polybenzimidazole thermoplastic particles.

* * * * *